United States Patent
Stojanovski et al.

(10) Patent No.: US 9,526,001 B2
(45) Date of Patent: Dec. 20, 2016

(54) DEVICE-TO-DEVICE DISCOVERY WITH DIRECT RADIO SIGNALS

(71) Applicant: Intel IP Corporation, Santa Clara, CA (US)

(72) Inventors: Alexandre S. Stojanovski, Paris (FR); Pingping Zong, Randolph, NJ (US); Youn Hyoung Heo, San Jose, CA (US); Muthaiah Venkatachalam, Beaverton, OR (US); Mo-Han Fong, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 177 days.

(21) Appl. No.: 14/122,646

(22) PCT Filed: Aug. 30, 2013

(86) PCT No.: PCT/US2013/057709
§ 371 (c)(1),
(2) Date: Nov. 26, 2013

(87) PCT Pub. No.: WO2014/113073
PCT Pub. Date: Jul. 24, 2014

(65) Prior Publication Data
US 2014/0378123 A1 Dec. 25, 2014

Related U.S. Application Data

(60) Provisional application No. 61/753,914, filed on Jan. 17, 2013.

(51) Int. Cl.
*H04W 4/00* (2009.01)
*H04W 12/04* (2009.01)
(Continued)

(52) U.S. Cl.
CPC .......... *H04W 12/04* (2013.01); *H04B 7/0417* (2013.01); *H04B 7/0456* (2013.01); *H04J 3/00* (2013.01);
(Continued)

(58) Field of Classification Search
CPC .......... H04W 12/06; H04W 8/18; H04W 4/00; H04W 4/008; H04W 72/042; H04W 76/023; H04W 88/085; H04W 28/0215; H04W 48/08; H04W 4/021; H04W 72/04; H04W 76/021; H04W 84/12; H04W 8/005; H04W 92/18; H04W 72/048; H04W 48/16; H04W 4/005; H04W 76/043; H04W 84/18; H04W 8/26; H04W 4/206; H04W 40/246; H04W 4/023; H04W 4/06; H04W 64/00; H04W 48/14; H04L 2209/80; H04L 67/16; H04L 29/08648
(Continued)

(56) References Cited

U.S. PATENT DOCUMENTS 6,574,266 B1 * 6/2003 Haartsen ....................... 375/133
8,060,590 B2 11/2011 Lobbert
(Continued)

OTHER PUBLICATIONS

International Search Report and Written Opinion mailed Oct. 31, 2013 from International Application No. PCT/US2013/057709.
(Continued)

*Primary Examiner* — Nimesh Patel
(74) *Attorney, Agent, or Firm* — Schwabe, Williamson & Wyatt, P.C.

(57) ABSTRACT

In embodiments, apparatuses, methods, and storage media may be described for establishing a direct connection between two UEs. Each UE may be provisioned with a temporary identifier by a server of a wireless network of the UE. The UEs may then be configured to broadcast the
(Continued)

temporary IDs in radio signals over radio resources that are separate from the radio resources of the network. The temporary IDs may not contain identifying information of the broadcasting UE that is interpretable without receiving further information from the network.

15 Claims, 6 Drawing Sheets (51) Int. Cl.

| | |
|---|---|
| H04L 5/00 | (2006.01) |
| H04B 7/04 | (2006.01) |
| H04W 72/02 | (2009.01) |
| H04L 29/06 | (2006.01) |
| H04L 29/08 | (2006.01) |
| H04W 36/22 | (2009.01) |
| H04W 76/04 | (2009.01) |
| H04W 16/32 | (2009.01) |
| H04W 48/16 | (2009.01) |
| H04W 72/04 | (2009.01) |
| H04W 56/00 | (2009.01) |
| H04L 5/22 | (2006.01) |
| H04J 3/00 | (2006.01) |
| H04W 74/00 | (2009.01) |
| H04W 72/12 | (2009.01) |
| H04W 72/00 | (2009.01) |
| H04W 28/02 | (2009.01) |
| H04W 52/02 | (2009.01) |
| H04W 76/02 | (2009.01) |
| H04W 48/20 | (2009.01) |
| H04W 24/02 | (2009.01) |
| H04W 24/10 | (2009.01) |
| H04L 1/18 | (2006.01) |
| H04L 5/14 | (2006.01) |
| H04L 9/14 | (2006.01) |
| H04W 8/00 | (2009.01) |
| H04W 68/02 | (2009.01) |
| H04W 4/06 | (2009.01) |
| H04W 48/08 | (2009.01) |
| H04W 88/06 | (2009.01) |
| H04W 36/00 | (2009.01) |
| H04W 84/12 | (2009.01) |

(52) U.S. Cl.
CPC ........... *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/14* (2013.01); *H04L 5/1469* (2013.01); *H04L 5/22* (2013.01); *H04L 9/14* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/22* (2013.01); *H04W 48/08* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/0406* (2013.01); *H04W 72/046* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 2209/24* (2013.01); *H04L 2209/80* (2013.01); *H04W 84/12* (2013.01)

(58) Field of Classification Search
USPC .................................................. 455/422.1, 39
See application file for complete search history.

(56) References Cited

U.S. PATENT DOCUMENTS

| | | | |
|---|---|---|---|
| 2005/0122927 A1* | 6/2005 | Wentink | 370/311 |
| 2010/0009675 A1* | 1/2010 | Wijting et al. | 455/426.1 |
| 2011/0040888 A1* | 2/2011 | Krishnaswamy et al. | 709/231 |
| 2011/0098043 A1* | 4/2011 | Yu et al. | 455/435.1 |
| 2011/0134827 A1* | 6/2011 | Hooli et al. | 370/315 |

OTHER PUBLICATIONS

Parno et al., "Challenges in Securing Vehicular Networks," 2005 sigcom, 6 pages.
International Preliminary Report on Patentability mailed Jul. 30, 2015 from International Application No. PCT/US2013/057709.

* cited by examiner

DEVICE-TO-DEVICE DISCOVERY WITH DIRECT RADIO SIGNALS

CROSS REFERENCE TO RELATED APPLICATIONS

The present application is a national phase entry under 35 U.S.C. §371 of International Application No. PCT/US2013/057709, filed Aug. 30, 2013, entitled "DEVICE-TO-DEVICE DISCOVERY WITH DIRECT RADIO SIGNALS", which designates the United States of America, and which claims priority to U.S. Provisional Patent Application No. 61/753,914, filed Jan. 17, 2013, entitled "Advanced Wireless Communication Systems and Techniques," the entire disclosure of which is hereby incorporated by reference in its entirety.

FIELD

Embodiments of the present invention relate generally to the technical field of monitoring and discovery in wireless systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Advances are being made in wireless networks and systems such as the Long Term Evolution (LTE) networks specified by the Third Generation Partnership Project (3GPP) standards. In some cases, a user equipment (UE) may wish to establish a direct connection with another UE. In these cases, it may not be ideal for the UE to be broadcasting its network identifier, because such a broadcast may be unsecured and put the UE at risk.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for establishing a direct connection between two UEs. In embodiments, each UE may belong to a network with a device-to-device (D2D) Server that may create a temporary ID for a UE of that network. The UEs may be provisioned with the temporary IDs, and be configured to broadcast the temporary IDs in radio signals over radio resources that are separate from the radio resources used for communication with the network. The temporary IDs may not contain identifying information of the broadcasting UE that can be distinguished without receiving further information from the network. By using these temporary IDs, the anonymity of a broadcasting UE may be preserved and the overall network security may be increased.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
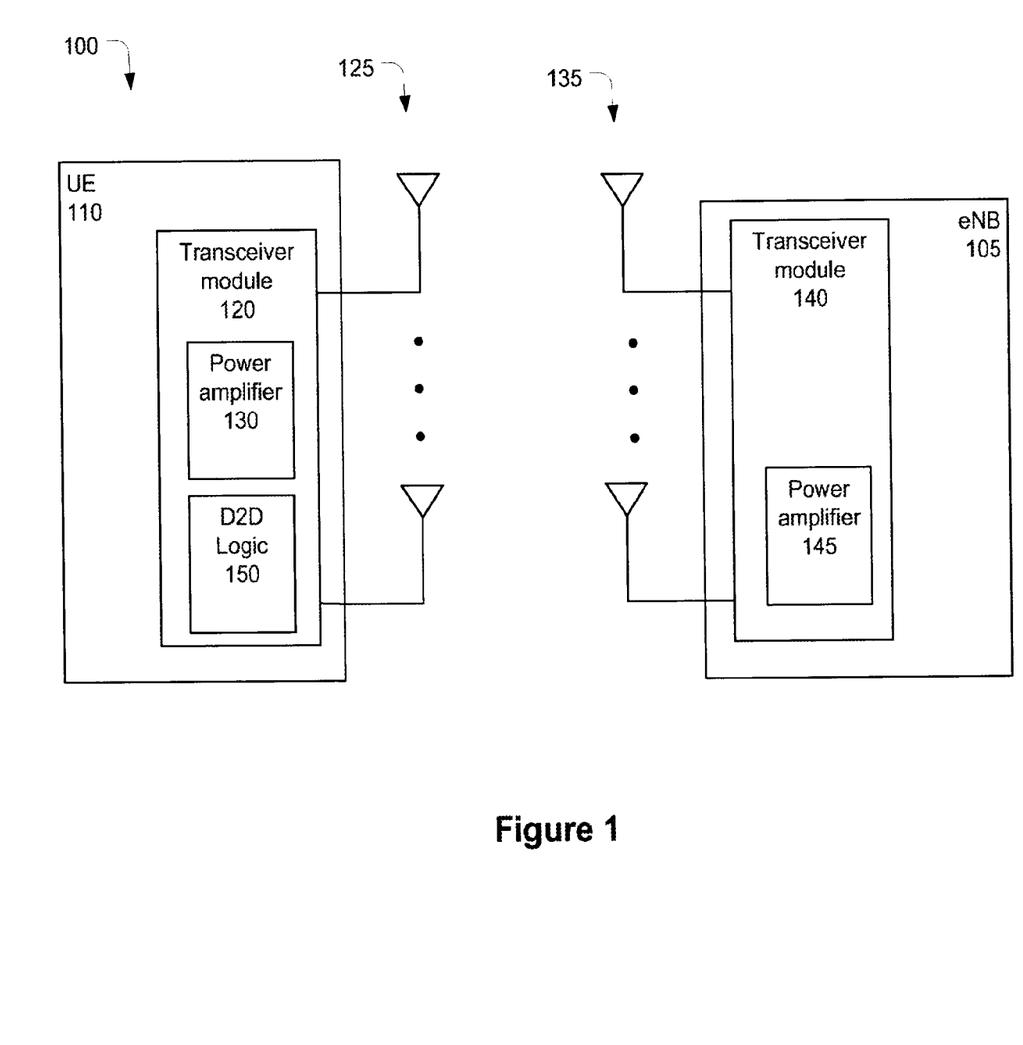
FIG. 1 schematically illustrates a high-level example of a network system comprising a UE and an eNB, in accordance with various embodiments.

FIG. 1 schematically illustrates a wireless communication network 100 in accordance with various embodiments. The wireless communication network 100 (hereinafter "network 100") may be an access network of a 3GPP LTE network such as evolved universal terrestrial radio access network (E-UTRAN). The network 100 may include an eNodeB (eNB, also referred to as an evolved NodeB) 105, configured to wirelessly communicate with a UE 110.

As shown in FIG. 1, the UE 110 may include a transceiver module 120. The transceiver module 120 may be coupled with one or more of a plurality of antennas 125 of the UE 110 for communicating wirelessly with other components of the network 100, e.g., eNB 105 or another UE. The antennas 125 may be powered by a power amplifier 130 which may be a component of the transceiver module 120, as shown in FIG. 1, or may be a separate component of the UE 110. In one embodiment, the power amplifier 130 provides the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD) or multiple-input multiple-output (MIMO). In certain embodiments the transceiver module 120 may contain both transmit and receive circuitry. In other embodiments, the transceiver module 120 may be replaced by transmit circuitry and receive circuitry which are separate from one another (not shown). In other embodiments, the transceiver module 120 may be coupled with processor circuitry configured to alter, process, or transform signals or data received from, or sent to, the transceiver module 120 (not shown). In some embodiments, the transceiver module 120 may include D2D logic 150 which may be used to analyze or create D2D signals sent or received from the UE 110, for example through use of antennas 125.

Similarly to the UE 110, the eNB 105 may include a transceiver module 140. The transceiver module 140 may be further coupled with one or more of a plurality of antennas 135 of the eNB 105 for communicating wirelessly with other components of the network 100, e.g., UE 110. The antennas 135 may be powered by a power amplifier 145 which may be a component of the transceiver module 140, as shown in FIG. 1, or may be a separate component of the eNB 105. In one embodiment, the power amplifier 145 provides the power for all transmissions on the antennas 135. In other embodiments, there may be multiple power amplifiers on the eNB 105. The use of multiple antennas 135 may allow for the eNB 105 to use transmit diversity techniques such as SORTD or MIMO. In certain embodiments the transceiver module 140 may contain both transmit and receive circuitry. In other embodiments, the transceiver module 140 may be replaced by transmit circuitry and receive circuitry which are separate from one another (not shown). In other embodiments, the transceiver module 140 may be coupled with processor circuitry configured to alter, process, or transform signals or data received from, or sent to, the transceiver module 120 (not shown).

Figure 2:
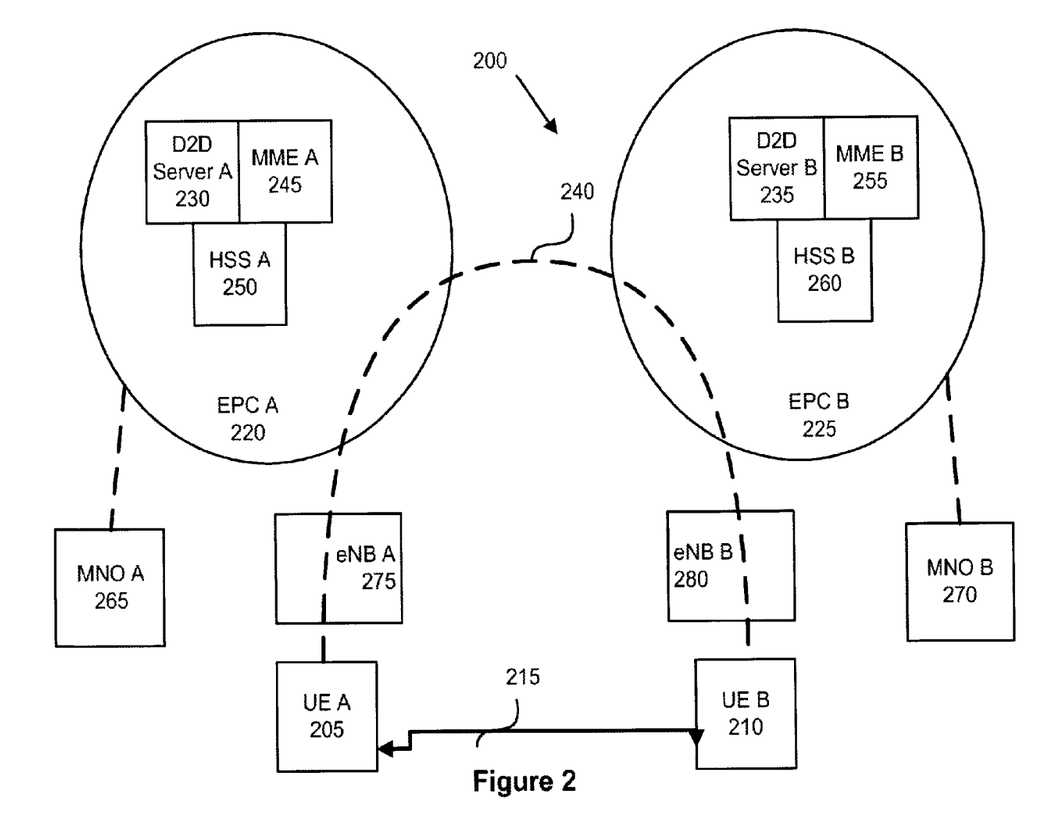
FIG. 2 depicts an example of a wireless system, in accordance with various embodiments.

FIG. 2 depicts an example of a wireless system 200 wherein one UE 205, "UE A," may wish to communicate directly with a second UE 210, "UE B" over a direct radio communication path 215. UE A 205 or UE B 210 may be similar to UE 110 described above with respect to FIG. 1, and the communication over the direct radio communication path 215 may occur via the one or more antennas 125 of UE 110. In some embodiments, this direct radio communication path 215 may be a path such as that described as part of the proximity-based services (ProSe) that may be part of Release 12 of the 3GPP specifications for LTE or LTE-Advanced (LTE-A). In some embodiments, the direct radio communication path 215 may also be considered part of a D2D system. For the sake of this disclosure, D2D will be used as a general term to refer to D2D, ProSe, or some other similar technology or specification, without loss of generality.

In some embodiments, the users of the two different UEs 205 and 210 may subscribe to the same or different mobile network operators (MNOs), e.g., MNO A 265 and MNO B 270, respectively. Each MNO may operate or otherwise be associated with an evolved packet core (EPC) as defined by the 3GPP Technical Specifications, such as Release 8 or later specifications. For example MNO A 265 may be associated with EPC A, and MNO B 270 may be associated with EPC B. Specifically, the user of UE A 205 may subscribe to MNO A 265 which operates a corresponding EPC A 220. Similarly, the user of UE B may subscribe to MNO B 270 which operates EPC B 225.

Generally, the EPC may be considered the core network for a given wireless network. For example, the EPC may be responsible for general functions such as user management, data transfer, etc. In embodiments, the EPC may include a home subscriber server (HSS), which may be a database containing user and subscriber-related information. Specifically, EPC A 220 may include HSS A 250, and EPC B 225 may include HSS B 260. An HSS may provide support functions in mobility management, call and session setup, user authentication and access authorization for a wireless network. Additionally, each EPC may also include a mobility management entity (MME) which may handle signaling related to mobility and security for network access. For example, EPC A 220 may include MME A 245, and EPC B 225 may include MME B 255. In embodiments, the EPC may be coupled with one or more eNBs such as eNB A 275 and eNB B 280 via one or more data interfaces between the MME and the respective eNBs. eNB A 275 and eNB B 280 may be similar to, for example, eNB 105 described above with respect to FIG. 1. In embodiments, the eNB A 275 and eNB B 280 may be considered part of the radio access network (RAN) which is operated by MNO A 265 and MNO B 270, respectively, but is separate from the EPC. In other embodiments, eNB A 275 and B 280 may be considered part of the overall network operated by a MNO A 265 and MNO B 270, respectively. In embodiments, an eNB, such as eNB A 275, may be directly coupled to an MME, such as MME A 245, via a wired or wireless connection. An eNB, such as eNB A 275, may be directly coupled to a UE, such as UE A 205, via a wireless connection.

In embodiments, each of EPC A 220 and EPC B 225 may include a D2D Server, such as D2D Server A 230 and D2D Server B 235. In some embodiments, one or both of D2D Servers A 230 and B 235 may be a D2D Server such as that discussed above with respect to Release 12 of the 3GPP Technical Specifications. In other embodiments, one or both of D2D Servers A 230 and B 235 may be an application server coupled with EPC A 220 or EPC B 225 and configured to perform D2D functions. Even though D2D Server A 230 and D2D Server B 235 are shown as respective elements of EPC A 220 and EPC B 225, in some embodiments one or both of D2D Server A 230 and D2D Server B 235 may be outside of, but communicatively coupled with, one or both of EPC A 220 and EPC B 225. In some embodiments, a single D2D Server may be coupled with a plurality of networks, such as both EPC A 220 and EPC B 225.

In embodiments, each D2D Server may store the D2D service profile of a subscriber for the MNO associated with that D2D Server. For example, D2D Server A 230 may store the D2D service profile for the user of UE A 205, while D2D Server B 235 may store the D2D service profile for the user of UE B 210. In embodiments, each D2D Server may be responsible for the handling of temporary identifiers, referred to herein as "Temp_IDs" that may be used for D2D discovery using direct radio signals. In embodiments, the "Temp_ID" may be a link-layer device identifier that a UE may transmit in a beacon signal for the lifetime of the identifier to identify the UE. For example, D2D Server A 230 may assign Temp_ID_A to UE A 205, and then UE A 205 may transmit Temp_ID_A in a beacon signal for the lifetime of Temp_ID. Another UE or device that receives Temp_ID_A may be able to identify UE A 205 as the UE associated with Temp_ID_A, as described in further detail below.

A Temp_ID may have the benefit of ensuring security on a radio network, because the Temp_ID may be used in D2D to ensure privacy on the radio signal, and prevent users from being tracked based on their beacon signals. Specifically, because the Temp_IDs are assigned by a D2D Server of the MNO, they may be randomized or anonymized. Therefore, any other entity that intercepts a beacon signal broadcast by a given UE may not be able to identify the specific UE, or the user of the UE, based solely on the beacon signal, without access to additional information.

In some cases, the lifetime of a Temp_ID may be configurable by one or both of the user and the network, and may vary significantly depending on the specific implementation of the Temp_ID. For example, two users who frequently need to discover each other, such as a husband and wife, may rely on relatively long-lived Temp_IDs for discovering one another. In parallel, each user may also use relatively short-lived Temp_IDs, for example a "one-shot" Temp_ID for occasional discovery with any other users. In general, each UE may have several Temp_IDs assigned to it by a D2D Server at a given time.

In some embodiments, UE A 205 may be able to indirectly communicate with UE B 210 via infrastructure path 240. For example, UE A 205 may be able to communicate indirectly with UE B 210 by first sending a signal along the infrastructure path 240 to eNB A 275, which in turn relays the signal to EPC A 220. EPC A 220 may then transmit the signal along the infrastructure path 240 to EPC B 225. EPC B 225 may then transmit the signal along the infrastructure path 240 to eNB B 280, which in turn relays it to UE B 210. As noted above, one or both of D2D Server A 230 and D2D Server B 235 may instead be operable to configure UE A 205 and UE B 210 to directly communicate to one another along the direct radio communication path 215 without utilizing radio resources associated with eNB A 275, eNB B 280, EPC A 220 and/or EPC B 225.

Figure 3:
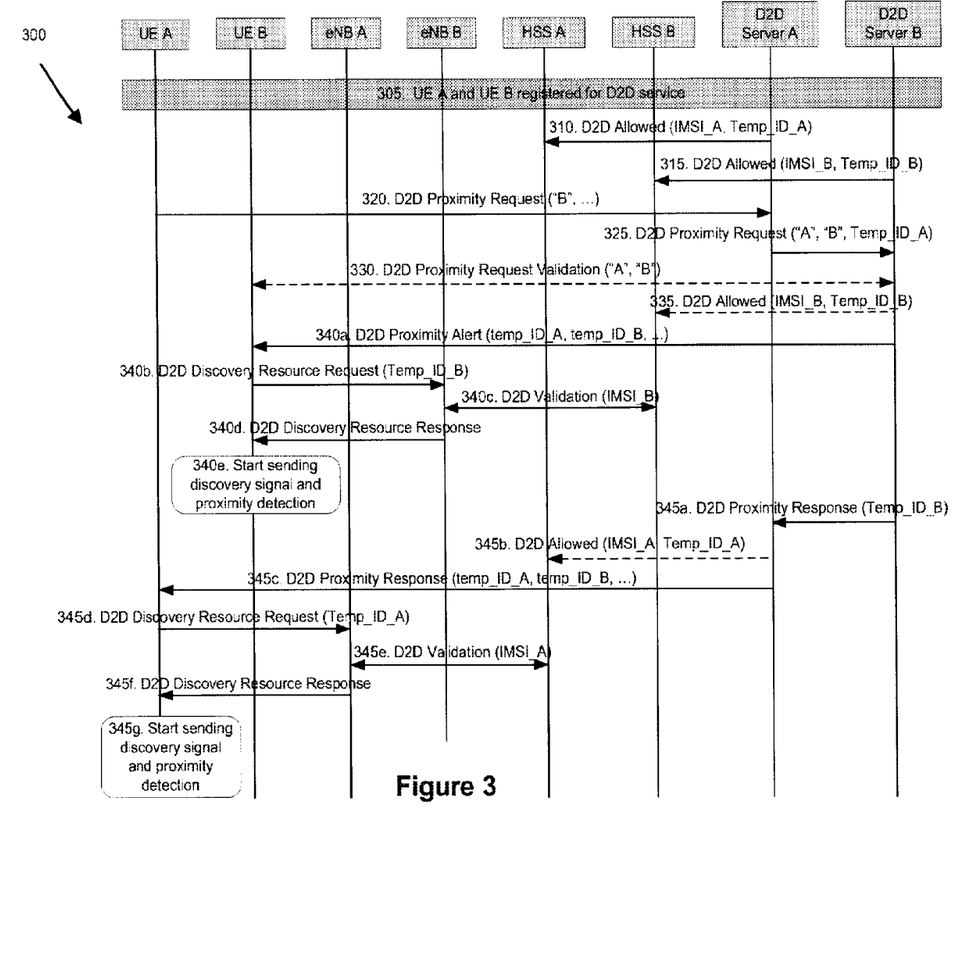
FIG. 3 depicts an example flow for device-to-device discovery and monitoring, in accordance with various embodiments.

FIG. 3 depicts an example process 300 that may be used to configure two UEs, UE A and UE B, for direct communication along direct radio communication path 215. For the sake of process 300, UE A may correspond to UE A 205, and UE B may correspond to UE B 210. Likewise, D2D Server A may correspond to D2D Server A 230, and D2D Server B may correspond to D2D Server B 235. eNB A may correspond to eNB A 275, and eNB B may correspond to eNB B 280. Additionally, HSS A may correspond to HSS A 250, and HSS B may correspond to HSS B 260. In embodiments, one or more of the D2D Allowed, D2D proximity Request, D2D Proximity Request Validation, D2D Proximity Alert, D2D Discovery Resource Request, D2D Validation, D2D Discovery Resource Response, or D2D Proximity Response messages described below may be considered to be transmitted via one or more network or system infrastructure paths such as infrastructure path 240, as described in further detail below.

Although HSS A and HSS B are depicted in FIG. 3, in some embodiments an HSS may not be directly coupled with an eNB of a given network, but instead may have to rely on an MME to relay the message to or from an eNB. In embodiments where the HSS is discussed, an additional or alternative operation may be performed by an MME to relay the message. In some embodiments, where information is discussed as stored on the HSS, it may additionally or alternatively be stored on the MME.

In embodiments, process 300 may be used to provision one or both of UE A and UE B with a temporary identifier that may be used for discovery and monitoring purposes on radio signals without comprising security. As shown in FIG. 3, UE A and UE B may be registered for D2D service at 305. Specifically, each UE may be registered for D2D with the D2D Server of the UE's MNO (for example, D2D Server A and D2D Server B). During the registration procedure, each UE may be assigned a temporary link-layer identifier. For the sake of this disclosure, only a single temporary identifier will be discussed for each UE, such as Temp_ID_A for UE A 205 and Temp_ID_B for UE B 210. However, as discussed above, in some embodiments a given UE may have a plurality of different Temp_IDs that may be used for different specific applications.

At the end of the registration procedure, D2D Server A may send a D2D Allowed message to HSS A which may be storing the profile of the user of UE A at 310. If UE A has been assigned a Temp_ID_A during the registration procedure at 305, then Temp_ID_A may also be included in the D2D Allowed message and stored in HSS_A. In embodiments, the D2D Allowed message may also include an international mobile subscriber identity (IMSI) for UE A, which may be referred to as IMSI_A. The IMSI_A may be a permanent identifier of UE A and may be used by the HSS_A to identify the UE which Temp_ID_A is associated with. The D2D Allowed message may be sent using a control plane message of the EPC associated with UE A.

In sequence or parallel to 310, D2D Server B may send a D2D Allowed message to HSS B at 315. The D2D Allowed message sent by D2D Server B may be similar to the D2D Allowed message sent by D2D Server A in that it may include both IMSI_B and/or Temp_ID_B. Similarly to IMSI_A, IMSI_B may be a permanent identifier of UE B, and may be used by the HSS_B to identify the UE which Temp_ID_B is associated with. The D2D Allowed message may be sent using an IP message at the user plane of the EPC associated with UE B (for example, along an infrastructure path such as infrastructure path 240).

UE A may then attempt to discover UE B. Specifically, UE A may send a D2D Proximity Request to D2D Server A at 320. The D2D Proximity Request message may specifically be a request by UE A for information for enablement of proximity detection with UE B. The D2D Proximity Request may include a permanent application identifier of UE B, referred to in FIG. 3 as "B." The application identifier may be a permanent identifier of UE B, which may be recognized as identifying UE B. The D2D Proximity Request may be sent as an IP message over the user plane of the EPC associated with UE A. Specifically, the D2D Proximity Request may be sent from UE A over a wireless signal of an LTE network to eNB A, which in turn may transmit the signal to D2D Server A. In embodiments, the D2D Proximity Request may be transmitted in the EPC user plane or via a non-access stratum (NAS) protocol from UE A to MME A. The message may then be further transmitted via a control plane protocol between MME A and D2D Server A.

Upon receiving the D2D Proximity Request from UE A at 320, the D2D Server A may identify the D2D server associated with UE B or the EPC that UE B is connected to (e.g., D2D Server B) by inspecting the application layer identifier "B." The D2D Server A may then forward the D2D Proximity Request message to D2D Server B at 325. The D2D Proximity Request message forwarded by D2D Server A may include additional information such as Temp_ID_A and possibly the application layer identifier of UE A, "A." In some embodiments, Temp_ID_A may be the Temp_ID_A assigned to UE A during the registration procedure at 305. In other embodiments, the D2D Server A may assign UE A a new Temp_ID_A to be used with the specific D2D Proximity Request message, e.g., "on the fly."

In some embodiments, the D2D Server B may optionally transmit a D2D Proximity Request Validation to UE B at 330. The Proximity Request Validation transmission may occur over an infrastructure path such as infrastructure path 240. Specifically, D2D Server B may transmit the D2D Proximity Request Validation to eNB B, which in turn may relay the D2D Proximity Request Validation to UE B. In some embodiments, the D2D Proximity Request Validation message may include "A" and "B." The D2D Proximity Request Validation message may be a message to the user of UE B to determine whether the user of UE B accepts the request by the user of UE A to engage in discovery using direct radio signals. In some embodiments, the transmission of the D2D Proximity Request Validation may not occur (for example, if the user of UE B has already indicated that they accept all requests for direct discovery, or requests from a specific user for direct discovery). In other embodiments, the D2D Proximity Request Validation may not occur at 330 dependent on settings set by one or both of MNO A or MNO B. In some embodiments, the user of UE B may respond with a D2D Proximity Request Validation Response message (not shown).

In some embodiments, the D2D Server B may optionally transmit a D2D Allowed message to HSS B at 335. In some embodiments, the D2D Allowed Message may include IMSI_B and Temp_ID_B. In some embodiments, the Temp_ID_B may be a new Temp_ID of UE B that is assigned during validation of the D2D Proximity Request by UE A.

The D2D Server B may then transmit a D2D Proximity Alert message to UE B at 340a. In some embodiments, the D2D Proximity Alert message may include both Temp_ID_A and Temp_ID_B. The D2D Allowed message may be transmitted in the EPC user plane or via a control plane protocol between D2D Server B and MME B, and then via NAS protocol from MME B to UE B.

A validation and resource allocation procedure may then be performed between UE B, eNB B, and HSS B. Specifically, UE B may transmit a D2D Discovery Resource Request to eNB B at 340b. The D2D Discovery Resource Request may include Temp_ID_B. In some embodiments, the D2D Discovery Resource Request may also include IMSI_B, or some other permanent or semi-permanent identifier of UE B (not shown) that the eNB B can use to identify UE B. The D2D Discovery Resource Request may be transmitted in, for example, a radio resource control (RRC) message, such as the RRC messages defined in the 3GPP specifications.

In response to the D2D Discovery Resource Request received at 340b, the eNB B may transmit a D2D Validation message to HSS B at 340c. The D2D Validation message may include one or both of IMSI_B and Temp_ID_B. Specifically, the eNB B may verify with HSS B that Temp_ID_B does in fact belong to UE B. This verification and authentication procedure may therefore be used as an added security procedure to prevent a UE from broadcasting Temp_IDs that were not assigned by the D2D Server. For example, if the eNB only sends IMSI_B to HSS B, then HSS B may respond with Temp_ID_B. By comparing the Temp_ID_B received from UE B with the Temp_ID_B received from HSS B, the eNB B may be able to verify that Temp_ID_B is correctly associated with UE B. These messages between the eNB B and HSS B at 340c may be relayed by an MME of EPC B (e.g., MME B 255). In some embodiments, MME B 255 may take the place of HSS B.

After verification that Temp_ID_B is correctly associated with UE B, the eNB B may then send a Discovery Resource Response message to UE B at 340d. In some embodiments, the Discovery Resource Response message may include an indication of the resources that UE B should use for UE B's beacon signal. The indication may be transmitted in an RRC message, and the radio resources may be assigned to UE B by one or both of eNB B or an MME of EPC B.

UE B may then begin sending its beacon signal, with Temp_ID_B, on the radio resource assigned to it at 340d. In embodiments, the radio resource may be a radio resource of the direct radio communication path 215 that is different from radio resources of the infrastructure path 240 of the LTE network(s) associated with UE A or UE B. Specifically, the radio resources used for the beacon signal and proximity detection may be wireless radio resources that are outside of the radio resources used, for example, to communicate between UE B and eNB B or UE A and eNB A along infrastructure path 240. Additionally, UE B may begin monitoring the available radio resources of the direct radio communication path 215 for the Temp_ID_A that UE B received in the D2D Proximity Alert message at 340a. In some embodiments, UE B may not know which radio resources have been assigned to UE A, and so UE B may need to monitor all available radio resources for Temp_ID_A.

In parallel with, before, or subsequent to, the validation and allocation procedure 340a-340e performed with respect to UE B, a similar validation and allocation procedure may be performed with respect to UE A. For example, D2D Server B may transmit a D2D Proximity Response message to D2D Server A at 345a. The D2D Proximity Response message may include Temp_ID_B. The Temp_ID_B may be either the Temp_ID_B assigned to UE B during the registration procedure at 305, or the Temp_ID_B assigned to UE B at 335 if the D2D Allowed message is transmitted at 335.

Optionally, a D2D Allowed message may be transmitted from D2D Server A to HSS A at 345b. In embodiments, the D2D Allowed message may include IMSI_A and Temp_ID_A. The D2D Allowed message may be required if, for example, D2D Server A assigned a new Temp_ID_A to UE A "on the fly" at 325. If the Temp_ID_A of UE A is still the Temp_ID_A assigned to UE A at 305, then the D2D Allowed message may be unnecessary. The D2D Proximity Response message may be transmitted in the EPC user plane or via a control plane protocol between D2D Server A and MME A, and then via NAS protocol from MME A to UE A In embodiments, the D2D Server A may then transmit a D2D Proximity Response message to UE A. In embodiments, the D2D Proximity Response message transmitted from D2D Server A may be similar to the D2D Proximity Response message transmitted from D2D Server B to UE B at 340a. The D2D Proximity Response message at 345c may include Temp_ID_A and Temp_ID_B, and may be transmitted over a network infrastructure path, such as infrastructure path 240. Specifically, the D2D Server A may transmit the D2D Proximity Response message to eNB A, which may in turn transmit the D2D Proximity Response message to UE A.

UE A may then conduct a validation and resource allocation procedure at 345d-345f that may be similar to the validation and resource allocation procedure conducted by UE B at 340b-340d. Specifically, UE A may transmit a Discovery Resource Request including Temp_ID_A to eNB A at 345d. In some embodiments, the Discovery Resource eNB A may then validate Temp_ID_A through one or more D2D Validation messages between eNB A and HSS A at 345e. In some embodiments, the D2D Validation messages may include at least IMSI_A or some other permanent or semi-permanent identifier of UE A. In some embodiments, the D2D Validation message may also include Temp_ID_A. As noted above, in some embodiments the one or more D2D Validation messages at 345e may be relayed or answered by an MME of EPC A rather than HSS A. Finally, eNB A may respond to UE A with a D2D Discovery Resource Response message at 345f which may allocate one or more radio resources to UE A. In some embodiments the Discovery Resource Request at 345d and the D2D Discovery Resource Response at 345f may be transmitted as RRC messages from the eNB A.

UE A may then begin sending its beacon signal, with Temp_ID_A, on the radio resource assigned to it at 345f. In embodiments, the radio resource may be a radio resource of the direct radio communication path 215 that is different from radio resources of the infrastructure path 240 of the LTE network(s) associated with UE A or UE B. Specifically, the radio resources used for the beacon signal and proximity detection may be wireless radio resources that are separate from the radio resources used, for example, to communicate between UE B and eNB B or UE A and eNB A along infrastructure path 240. Additionally, UE A may begin monitoring the available radio resources of the direct radio communication path 215 for the Temp_ID_B that UE A received in the D2D Proximity Response message at 345c. In some embodiments, UE A may not know which radio resources have been assigned to UE B, and so UE A may need to monitor all available radio resources for Temp_ID_B.

As can be seen in the discussion of the process 300 above, the different elements 305-345g may provide an additional layer of security of UE A and UE B to establish a direct connection. Through the use of process 300, UE A may be aware of a network-assigned temporary ID of UE B, and vice versa. Similarly, UE A may only be broadcasting its temporary ID over the direct radio communication path 215 and only listening for the temporary ID of UE B, rather than a permanent identifier of UE B such as IMSI_B or "B." Therefore, a third party that is monitoring the radio resources may not be able to identify UE A or UE B from their respective beacon signals on the direct radio communication path 215. In embodiments, the broadcast of a temporary ID between a UE and its respective eNB (e.g., the D2D Discovery Resource Request at 340a, 340b, 345c, or 345d) may be considered to be relatively secure because it may be broadcast over infrastructure path 240 using standard radio procedures that may already provide encryption of the signals. In embodiments, the system 200 that process 300 is related to may be considered a "restricted" system in that D2D communications between two UEs undergo the authentication and radio resource allocation process described above, and both UEs wishing to establish a D2D connection may be required to identify the Temp_ID of the other.

Figure 4:
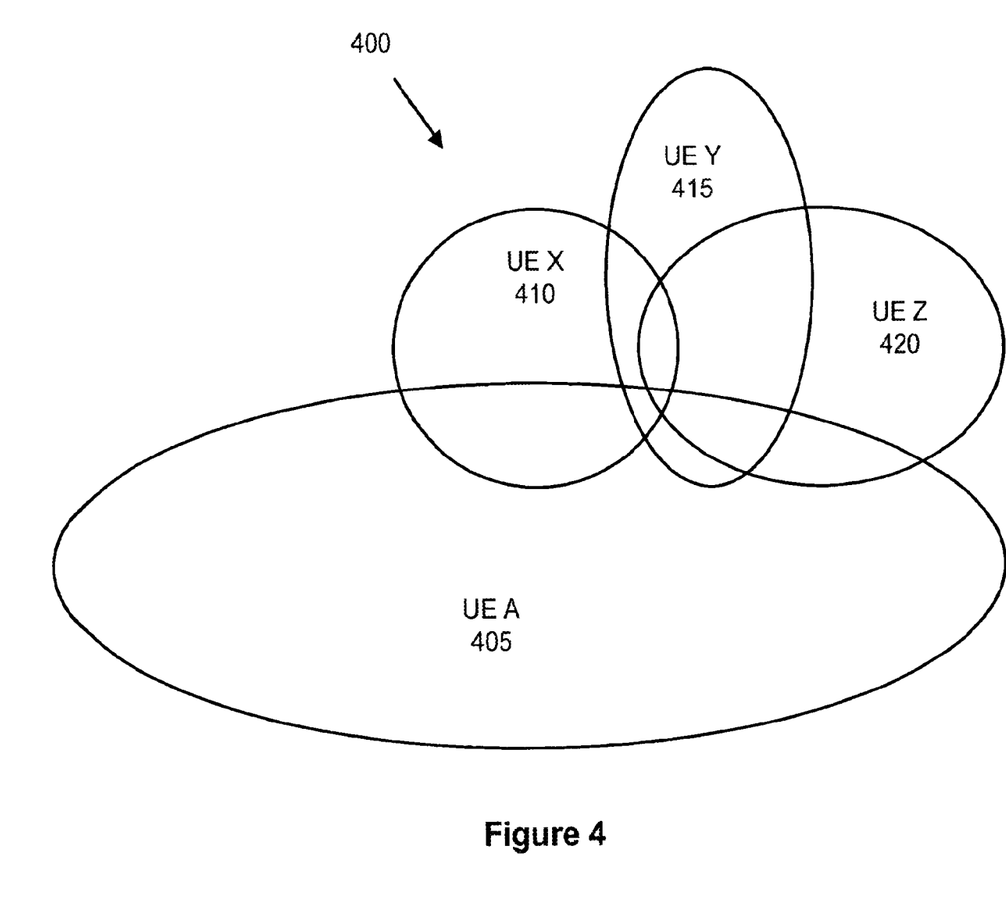
FIG. 4 depicts an example of another wireless system, in accordance with various embodiments.

By contrast, FIG. 4 depicts what may be considered an "open" system 400. A UE A 405 may have a signal reception range that overlaps with the beacon transmission range of UEs X 410, Y 415, and Z 420. For the sake of this example, it may be assumed that UE A 405, UE X 410, UE Y 415, and UE Z 420 are all D2D enabled. Additionally, it may be assumed that each UE 405, 410, 415, and 420 is subscribed to an MNO that allows the use of D2D. Also, although only 3 UEs X 410, Y 415 and Z 420 are depicted, there may be as few as one or as many as hundreds of UEs within signal reception range of UE A 405. In embodiments, UEs X 410, Y 415 and Z 420 may belong to different businesses (for example, restaurants, storefronts, hospitals, etc.), or they may belong to a specific person.

Figure 5:
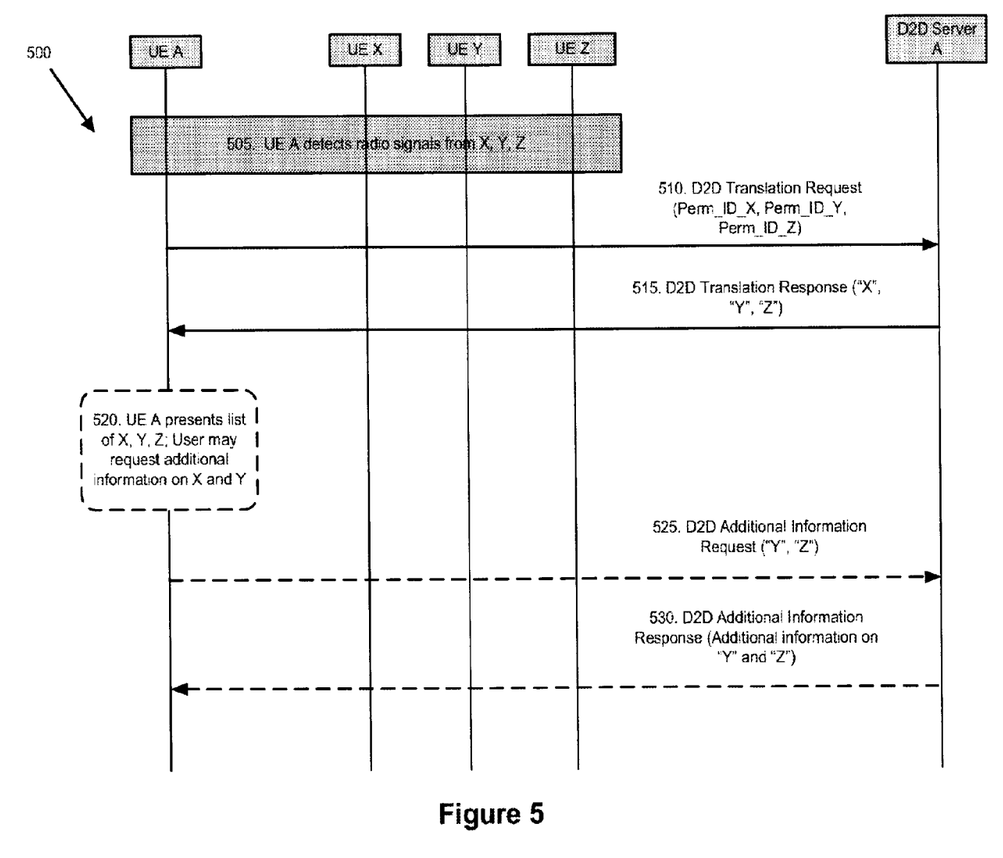
FIG. 5 depicts an example of another flow for device-to-device discovery and monitoring, in accordance with various embodiments.

FIG. 5 depicts a process 500 for a UE such as UE A in system 400. In embodiments, UE A in FIG. 5 may correspond to UE A 405 in FIG. 4. UE X in FIG. 5 may correspond to UE X 410. UE Y in FIG. 5 may correspond to UE Y 415. Finally, UE Z in FIG. 5 may correspond to UE Z 420. D2D Server A in FIG. 5 may correspond to a D2D Server of an EPC associated with UE A.

In embodiments, UEs X, Y and Z may be assigned permanent or semi-permanent link-layer identifiers, which may be referred to as Perm_ID_X, Perm_ID_Y, and Perm_ID_Z. It will be understood that the designator "Perm" is used herein to distinguish from the shorter-lived temporary identifiers such as "Temp" used above with respect to process 300. However, a "Perm" identifier may still be semi-permanent or temporary and have a shorter lifetime than an identifier such as an IM SI or an application identifier discussed above. In some embodiments a "Temp" identifier may be used in place of the "Perm" identifiers in Process 500. In some embodiments each identifier, whether a "Temp" or "Perm" identifier, may include a subset of data (for example, an octet of data) that may identify the UE as belonging to a specific type or category. For example, one octet value in the "Temp" or "Perm" identifier may designate the UE as being a restaurant, while another value may designate the UE as being a shop, a hospital, or a personal UE. In embodiments, if the octet identifies the UE as being a personal UE, then process 300 may be more appropriate, while if the octet identifies the UE as being a business-type UE, then process 500 may be more appropriate.

In process 500, UE A may receive a plurality of temporary, permanent, or semi-permanent IDs from other UEs within range of UE A. The user of UE A may request that the UE distinguish the identifiers of a specific category (for example, restaurants), and the UE may identify the specific identifiers of UEs X, Y, and Z based, e.g., on the octet of data. Specifically, the UE may filter the received signals to identify Perm_ID_X, Perm_ID_Y, and Perm_ID_Z at 505. As discussed above with respect to temporary IDs, the Perm_IDs of the various UEs may be assigned by a D2D Server of an MNO associated with each UE, and may be anonymous or semi-anonymous identifiers of each of the UEs. The identifiers may be received on radio resources of a direct link, such as direct radio communication path 215 described above with respect to FIG. 2, rather than radio resources of a network infrastructure, such as infrastructure path 240.

The UE may then send a D2D Translation Request to D2D Server A at 510. The D2D Translation Request may be transmitted using a network infrastructure path, such as infrastructure path 240 described above with respect to FIG. 2. The D2D Translation Request may include one or all Perm_ID_X, Perm_ID_Y, and/or Perm_ID_Z. Specifically, the D2D Translation Request may be sent in response to the user of UE A seeking information about the names or other characteristics of the restaurants or other businesses associated with UE X, UE Y, and UE Z.

In response to the translation request, the D2D Server A may send a D2D Translation Response to UE A at 515. In embodiments, the D2D Translation Response may include an application layer identifier such as "X," "Y," and "Z." In embodiments, the permanent or semi-permanent identifier, such as "X," may be used to identify a name, website, address, phone number, or other associated information of the restaurant or other business associated with UE X.

Similarly, the permanent or semi-permanent identifiers such as "Y" or "Z" may be used to identify the restaurants or other businesses associated with UEs Y and Z. The D2D Translation Response message may be transmitted over a network infrastructure path, such as infrastructure path 240 discussed above with respect to FIG. 2.

Optionally, UE A may then present the names, addresses, websites, phone numbers, or other information related to the businesses associated with UEs X, Y, and Z to the user of UE A at 520. In some embodiments, the user may request additional information for one or more of the businesses. For example, the user may request additional information on the businesses associated with UE X and UE Y.

UE A may then transmit a D2D Additional Information Request to D2D Server A at 525. In some embodiments, the D2D Additional Information Request may include a permanent or semi-permanent identifier of the UE(s) that the user is requesting further information on. For example, if the user wants more information on the businesses associated with UEs X and Y, then the D2D Additional Information Request may include the identifiers "X" and "Y." In some embodiments, the D2D Additional Information Request may also include information such as a pre-shared secret for establishing a direct communication link with one or more of UEs X, Y, or Z. The D2D Server A may then respond with the additional information in a D2D Additional Information Response at 530. For example, the additional information may include information such as videos, a menu of the restaurant, biographies of key personnel, or any other information. The D2D Additional Information Request at 525 and the D2D Additional Information Response at 530 may be transmitted over a network infrastructure path, such as infrastructure path 240.

Figure 6:
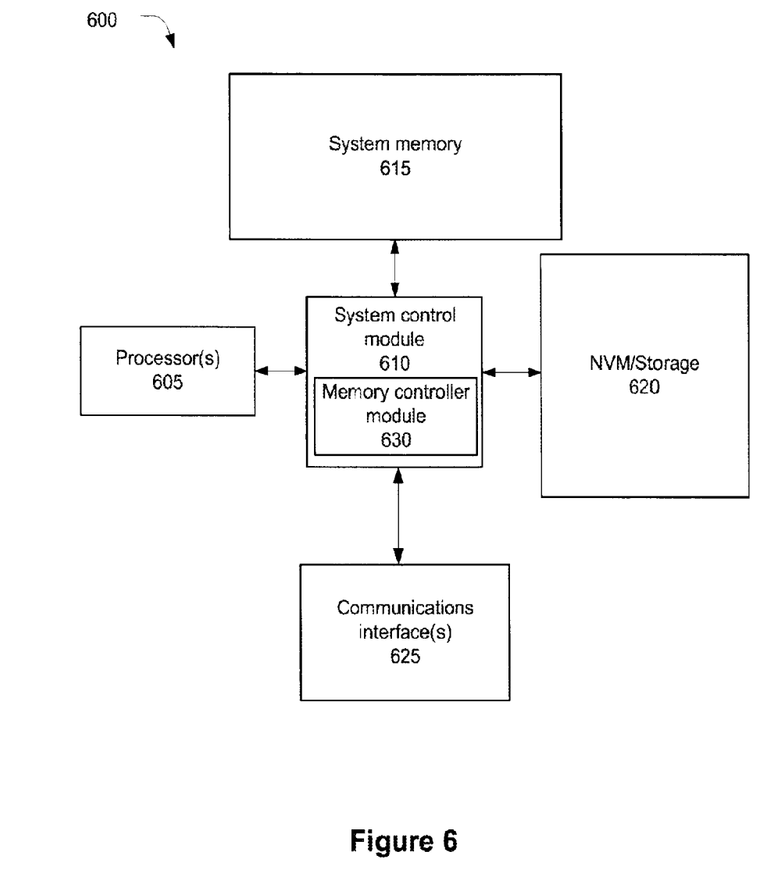
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 as described herein. In other embodiments, the system 600 may be capable of functioning as the eNB 105 depicted in the embodiment shown in FIG. 1, or any one of the other described embodiments. In other embodiments, the system 600 may be capable of functioning as one or more of a D2D Server such as D2D Server A 230 or D2D Server B 235. In some embodiments, the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 620 may include a storage resource physically part of a device on which the system 600 is installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. For example, the communications interface(s) 625 may be coupled with the transceiver module 140 discussed above with respect to FIG. 1.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, etc.). In various embodiments, the system 600 may have more or less components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

Methods and apparatuses are provided herein for Example 1 may include an apparatus for remote discovery, the apparatus to be employed in a user equipment (UE), the apparatus comprising: transmit circuitry to transmit, to a server of a wireless network, a proximity request message to enable discovery of a remote UE; and receive circuitry to: receive, from the server of the wireless network, a proximity response message that includes a temporary identifier of the UE and a temporary identifier of the remote UE; and receive, from the remote UE over a direct wireless connection, a signal that includes the temporary identifier of the remote UE.

Example 2 may include the apparatus of example 1, wherein the transmit circuitry is further to transmit, to an eNodeB (eNB) of the wireless network, a validation request that includes the temporary identifier of the UE; and the receive circuitry is further to receive, from the eNB, a validation response based at least in part on the validation request.

Example 3 may include the apparatus of example 1, wherein the proximity request message includes an application identifier of the remote UE, the application identifier of the remote UE being different from the temporary identifier of the remote UE.

Example 4 may include the apparatus of any of examples 1-3, wherein the wireless network uses a first plurality of radio resources, and the direct wireless connection uses a direct radio resource that is different from the first plurality of radio resources.

Example 5 may include the apparatus of any of examples 1-3, wherein the server is a proximity-based services (ProSe) server or a device-to-device server of the wireless network.

Example 6 may include the apparatus of any of examples 1-3, further comprising: a display; and an applications processor coupled with the display to render graphics on the display.

Example 7 may include one or more non-transitory computer readable media comprising instructions for remote discovery that, when executed by one or more processors of a user equipment (UE), cause the UE to: receive, from a server of a wireless network, a proximity response or proximity alert message including a temporary identifier of the UE; transmit, to an eNodeB (eNB) of the wireless network, a validation request including the temporary identifier of the UE; receive, in response to the validation request, a validation response including a radio resource; and transmit, in response to the validation response, a discovery signal on the radio resource, the discovery signal including the temporary identifier of the UE.

Example 8 may include the one or more non-transitory computer readable media of example 7, wherein the proximity alert message further includes a temporary identifier of a remote UE.

Example 9 may include the one or more non-transitory computer readable media of example 7, wherein the instructions are further to: monitor a plurality of radio resources for the temporary identifier of the remote UE, the plurality of radio resources being different from a radio resource used for communication with the wireless network.

Example 10 may include the one or more non-transitory computer readable media of any of examples 7-9, wherein the temporary identifier is different from an application layer identifier of the UE.

Example 11 may include the one or more non-transitory computer readable media of any of examples 7-9, wherein the temporary identifier is a temporary identifier assigned by a server of the wireless network.

Example 12 may include the one or more non-transitory computer readable media of example 11, wherein the server is a proximity-based services (ProSe) server or a device-to-device server of the wireless network.

Example 13 may include an apparatus for remote discovery, the apparatus to be employed in a user equipment (UE), the apparatus comprising: transmit circuitry to transmit a translation request to a server, the translation request including a temporary identifier of a remote UE; and receive circuitry to receive, in response to the translation request, an application layer identifier or a textual description of the remote UE.

Example 14 may include the apparatus of example 13, wherein the receive circuitry is further to receive, over a direct radio signal from the remote UE, the temporary identifier of the remote UE.

Example 15 may include the apparatus of examples 13 or 14, wherein the server is a server of a third generation partnership project (3GPP) network that includes a plurality of radio resources, and the transmit circuitry is to transmit the translation request over a radio resource of the plurality of radio resources; and the direct radio signal is a direct radio signal on a radio resource that is different from a radio resource of the plurality of radio resources.

Example 16 may include the apparatus of example 15, wherein the server is a proximity-based services (ProSe) server or a device-to-device server of the wireless network.

Example 17 may include the apparatus of examples 13 or 14, wherein the temporary identifier includes a portion of data, the portion of data to identify a type of the remote UE.

Example 18 may include the apparatus of example 17, wherein the type of the remote UE may be based at least in part on a category of business, a name, or a location associated with the remote UE.

Example 19 may include the apparatus of example 17, wherein the portion of data comprises eight bits of data.

Example 20 may include a method of remote discovery comprising: transmitting, from a server of a third generation partnership project (3GPP) network, an indication to a network node in the 3GPP network that a first user equipment (UE) in the 3GPP network is allowed to engage in direct discovery with a second UE in the 3GPP network, the indication including a temporary identifier of the first UE; receiving, by the server, a proximity request from the first UE to engage in direct discovery with the second UE, the request including an application identifier of the second UE; transmitting, by the server and based at least in part on the request from the first UE, a request to a second server in the 3GPP network, the request including the application identifier of the second UE and the temporary identifier of the first UE; receiving, by the server, a proximity response from the second server, the proximity response including a temporary identifier of the second UE; and transmitting, by the server, the proximity response to the first UE, the proximity response including the temporary identifier of the first UE and the temporary identifier of the second UE.

Example 21 may include the method of example 20, wherein the network node is a home subscriber server (HSS) or a mobility management entity (MME) of the 3GPP network.

Example 22 may include a method for remote discovery, the method comprising: transmitting, from a user equipment (UE) to a server of a wireless network, a proximity request message to enable discovery of a remote UE; receiving, from the server of the wireless network, a proximity response message that includes a temporary identifier of the UE and a temporary identifier of the remote UE; and receiving, from the remote UE over a direct wireless connection, a signal that includes the temporary identifier of the remote UE.

Example 23 may include the method of example 22, further comprising: transmitting, to an eNodeB (eNB) of the wireless network, a validation request that includes the temporary identifier of the UE; and receiving, from the eNB, a validation response based at least in part on the validation request.

Example 24 may include the method of example 22, wherein the proximity request message includes an application identifier of the remote UE, the application identifier of the remote UE being different from the temporary identifier of the remote UE.

Example 25 may include the method of any of examples 22-24, wherein the wireless network uses a first plurality of radio resources, and the direct wireless connection uses a direct radio resource that is different from the first plurality of radio resources.

Example 26 may include the method of any of examples 22-24, wherein the server is a proximity-based services (ProSe) server or a device-to-device server of the wireless network.

Example 27 may include an apparatus for remote discovery, the apparatus comprising: means for transmitting, from a user equipment (UE) to a server of a wireless network, a proximity request message to enable discovery of a remote UE; means for receiving, from the server of the wireless network, a proximity response message that includes a temporary identifier of the UE and a temporary identifier of the remote UE; and means for receiving, from the remote UE over a direct wireless connection, a signal that includes the temporary identifier of the remote UE.

Example 28 may include the apparatus of example 27, further comprising: means for transmitting, to an eNodeB (eNB) of the wireless network, a validation request that includes the temporary identifier of the UE; and means for receiving, from the eNB, a validation response based at least in part on the validation request.

Example 29 may include the apparatus of example 27, wherein the proximity request message includes an application identifier of the remote UE, the application identifier of the remote UE being different from the temporary identifier of the remote UE.

Example 30 may include the apparatus of any of examples 27-29, wherein the wireless network uses a first plurality of radio resources, and the direct wireless connection uses a direct radio resource that is different from the first plurality of radio resources.

Example 31 may include the apparatus of any of examples 27-29, wherein the server is a proximity-based services (ProSe) server or a device-to-device server of the wireless network.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. An apparatus to be employed in a user equipment (UE), the apparatus comprising:
transmit circuitry to transmit, to a server of a wireless network, a proximity request message to enable discovery of a remote UE; and
receive circuitry to:
in response to the transmission of the proximity request message, a proximity response message that includes a temporary identifier assigned to the UE and a temporary identifier of the remote UE, wherein the temporary identifier assigned to the UE is different from a permanent identifier of the UE, and the temporary identifier of the remote UE is different from a permanent identifier of the remote UE; and
receive, from the remote UE over a direct wireless connection, a signal that includes the temporary identifier of the remote UE.

2. The apparatus of claim 1, wherein the transmit circuitry is further to transmit, to an eNodeB (eNB) of the wireless network, a validation request that includes the temporary identifier of the UE; and
the receive circuitry is further to receive, from the eNB, a validation response based at least in part on the validation request.

3. The apparatus of claim 1, wherein the proximity request message includes an application identifier of the remote UE, the application identifier of the remote UE being different from the temporary identifier of the remote UE.

4. The apparatus of any of claim 1, wherein the wireless network uses a first plurality of radio resources, and the direct wireless connection uses a direct radio resource that is different from the first plurality of radio resources.

5. The apparatus of claim 1, wherein the server is a proximity-based services (ProSe) server or a device-to-device server of the wireless network.

6. The apparatus of claim 1, further comprising:
a display; and
an applications processor coupled with the display to render graphics on the display.

7. One or more non-transitory computer readable media comprising instructions that, when executed by one or more processors of a user equipment (UE), cause the UE to:
transmit, to a server of a wireless network, a proximity request message for discovery of a remote UE;
receive, from the server of the wireless network based on the proximity request message, a proximity response or proximity alert message that includes a temporary identifier assigned to the UE, wherein the temporary identifier is different than a permanent identifier of the UE;
transmit, to an eNodeB (eNB) of the wireless network, a validation request including the temporary identifier of the UE;
receive, in response to the validation request, a validation response including a radio resource; and
transmit, in response to the validation response, a discovery signal on the radio resource, the discovery signal including the temporary identifier of the UE.

8. The one or more non-transitory computer readable media of claim 7, wherein the proximity alert message further includes a temporary identifier of the remote UE.

9. The one or more non-transitory computer readable media of claim 7, wherein the instructions are further to:
monitor a plurality of radio resources for the temporary identifier of the remote UE, the plurality of radio resources being different from a radio resource used for communication with the wireless network.

10. The one or more non-transitory computer readable media of claim 7, wherein the temporary identifier is different from an application layer identifier of the UE.

11. A method comprising:
transmitting, from a server of a third generation partnership project (3GPP) network, an indication to a network node in the 3GPP network that a first user equipment (UE) in the 3GPP network is allowed to engage in direct discovery with a second UE in the 3GPP network;
receiving, by the server, a proximity request from the first UE to engage in direct discovery with the second UE, the request including an application identifier of the second UE;
assigning, by the server, a temporary identifier to the first UE in response to reception of the proximity request from the first UE that is different from a permanent identifier of the first UE;
transmitting, by the server and based at least in part on the request from the first UE, a request to a second server in the 3GPP network, the request including the application identifier of the second UE and the temporary identifier of the first UE;
receiving, by the server, a proximity response from the second server, the proximity response including a temporary identifier of the second UE that is different from a permanent identifier of the second UE; and
transmitting, by the server, the proximity response to the first UE, the proximity response including the temporary identifier of the first UE and the temporary identifier of the second UE.

12. The method of claim 11, wherein the network node is a home subscriber server (HSS) or a mobility management entity (MME) of the 3GPP network.

13. The method of claim 1, wherein the temporary identifier assigned to the UE includes a temporary link-layer identifier.

14. The method of claim 7, wherein the temporary identifier assigned to the UE includes a temporary link-layer identifier.

15. The method of claim 11, wherein assigning the temporary identifier to the first UE includes assigning a temporary link-layer identifier to the UE.

* * * * *